United States Patent
Purves et al.

(10) Patent No.: US 10,429,529 B2
(45) Date of Patent: Oct. 1, 2019

(54) ADAPTIVE FAULT TRACKING

(71) Applicant: Foster Findlay Associates Limited, Newcastle upon Tyne (GB)

(72) Inventors: Stephen Purves, Santa Cruz de Tenerife (ES); James Lowell, Medomsley (GB); Dale Norton, Oldham (GB); Jonathan Henderson, Morpeth (GB); Gaynor Paton, Aberdeen (GB); Nicholas McArdle, Aberdeen (GB)

(73) Assignee: Foster Findlay Associates Limited, Newcastle upon Tyne (GB)

( * ) Notice: Subject to any disclaimer, the term of this patent is extended or adjusted under 35 U.S.C. 154(b) by 416 days.

(21) Appl. No.: 14/579,558

(22) Filed: Dec. 22, 2014

(65) Prior Publication Data

US 2015/0234067 A1  Aug. 20, 2015

Related U.S. Application Data

(62) Division of application No. PCT/GB2013/050939, filed on Apr. 11, 2013.

(30) Foreign Application Priority Data

Jun. 29, 2012 (GB) .................................. 1211607.5

(51) Int. Cl.
*G01V 1/30* (2006.01)
*G01V 1/50* (2006.01)
(Continued)

(52) U.S. Cl.
CPC .............. *G01V 1/30* (2013.01); *G01V 1/301* (2013.01); *G01V 2210/641* (2013.01); *G01V 2210/642* (2013.01)

(58) Field of Classification Search
CPC ........................... G01V 1/30; G01V 2210/642
(Continued)

(56) References Cited

U.S. PATENT DOCUMENTS 5,251,184 A    10/1993  Hildebrand et al.
5,586,082 A *  12/1996  Anderson ................ G01V 1/30
                                                              367/38
(Continued)

FOREIGN PATENT DOCUMENTS

GB    2458571 A    9/2009
GB    2503507 A    1/2014
(Continued)

OTHER PUBLICATIONS

Benoît, Lorne, "International Search Report," prepared for PCT/GB2013/050939, dated Jan. 31, 2014, four pages.
(Continued)

*Primary Examiner* — Moazzam Hossain
(74) *Attorney, Agent, or Firm* — Winstead PC

(57) ABSTRACT

A method for adaptively determining one or more faults from geological survey data includes: (a) generating at least one attribute volume comprising a plurality of attributes from said geological survey data; (b) identifying at least one region of interest on a predetermined cross-section of said at least one attribute volume; (c) adding at least one seed to said at least one region of interest; (d) defining at least one representative area in accordance with said region of interest; (e) starting an initial generation of at least one basic geological object by adapting said at least one seed and/or representative area; (f) selectively determining growth confidence levels for any of said at least one basic geological object based on a realistic geological principles, and mapping said at least one basic geological object with colour-coded data of said growth confidence levels; (g) monitoring (Continued)

a visual representation of said at least one basic geological object during said initial generation; (h) selectively stopping said initial generation of said at least one basic geological object; (i) generating at least one optimized geological object through manipulation of at least part of said at least one basic geological object, wherein said at least one basic geological object is generated by applying a mesh propagation algorithm adapted to generate a surface mesh from said at least one seed, and which includes at least on predetermined constraint, including at least one external force, obtained from empirical geological data, and at least one internal force adapted to maintain the surface shape of said surface mesh.

18 Claims, 16 Drawing Sheets

(51) Int. Cl.
*G01V 1/22* (2006.01)
*G01V 1/34* (2006.01)

(58) Field of Classification Search
USPC .......................................................... 702/14
See application file for complete search history.

(56) References Cited

U.S. PATENT DOCUMENTS

| | | | |
|---|---|---|---|
| 2008/0195358 A1* | 8/2008 | El Ouair | G01V 1/30 703/2 |
| 2008/0243749 A1* | 10/2008 | Pepper | G01V 1/34 706/47 |
| 2010/0235154 A1* | 9/2010 | Meurer | G01V 11/00 703/10 |
| 2010/0286920 A1* | 11/2010 | Day | G01V 1/30 702/17 |
| 2011/0205844 A1* | 8/2011 | Maucec | G01V 99/00 367/43 |
| 2011/0255370 A1* | 10/2011 | Hirabayashi | G01V 1/42 367/31 |
| 2012/0257796 A1* | 10/2012 | Henderson | G01V 1/32 382/109 |
| 2013/0229891 A1* | 9/2013 | Witte | G01V 1/34 367/9 |

FOREIGN PATENT DOCUMENTS

| | | |
|---|---|---|
| WO | WO-02061463 A1 | 8/2002 |
| WO | WO-2009082563 A1 | 7/2009 |
| WO | WO-2014001750 A2 | 1/2014 |

OTHER PUBLICATIONS

Paton, Gaynor, et al., "Adaptive Geobodies: Delineation of Complex and Heterogeneous Stratigraphic Features," Annual International SEG Meeting, Jan. 1, 2011, pp. 4384-4387.

Paton, Gaynor, et al., "Adaptive Geobodies: Delineation of Complex and Heterogeneous Stratigraphic Features," Annual International SEG Meeting, Aug. 9, 2011, pp. 4384-4387.

* cited by examiner

ADAPTIVE FAULT TRACKING

The present invention relates generally to the field of oil and gas exploration, and in particular to the field of computer aided exploration for hydrocarbons using geophysical data, such as for example seismic data, of the earth. In particular, the present invention relates to a computerized method and computer system for adaptively determining faults in a volume of representative geophysical survey data.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1 shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 which travel down through the seabed and reflect back from the different layers of rock 18, 20, 22. The reflected sound waves 14 are then received by the hydrophones (not shown) located along the seismic streamers which when processed can be used to provide a visual representation (2D, 3D) of the substrata.

Typical seismic traces of the reflections (amplitudes) are shown in FIG. 2. The data shown in FIG. 2 has been migrated, i.e. the amplitudes of the traces are moved to their true subsurface position (depth) to eliminate any offset between the source and receiver.

FIGS. 3 and 4 show an example of a 3D seismic data volume 24 and a respective 2D slice 26 of the 3D seismic volume 24 based on the migrated reflectivity data. The representation clearly shows different horizons 28 (i.e. the surface separating two strata having different acoustic properties) and allows the identification of faults 30. In the field of geology, faults 30 are surfaces within the earth's crust at which sedimentary layers (strata, horizons) and other geological features are disrupted. In particular, faults 30 can form effective barriers to subsurface hydrocarbon flow, causing oil and gas to accumulate at faults 30.

Accordingly, the precise detection and characterization of faults 30 is an important tool in the search for oil and gas reserves, and the accuracy and completeness with which such faults 30 can be detected and characterized may have a significant impact on identifying and exploiting those reserves.

However, the interpretation of the vast geological data accumulated in, for example, 3D seismic data surveys, is a very time-consuming task that currently requires advanced interpretation workstations and trained experienced personnel, such as an experienced geophysicist (i.e. interpreter). For example, it is still common practice to manually identify and interpret fault lines in 2D slices 26 of a 3D seismic data volume 24, in order to create a representation of the fault planes within the seismic data volume 24. This is a very labour intensive process that is difficult to automate due to the level of expert knowledge and experience required.

In a conventional workflow (i.e. a series of concatenated steps undertaken by an operator) for fault interpretation, the workstation operator (interpreter) (i) views the seismic data volume on a display, (ii) manually determines by viewing the seismic data where a plurality of horizons may be located in the seismic data, and (iii) manually determines by viewing the coherence of the horizons where fault cuts may be located. During this process, the workstation operator (interpreter) has to ensure that the determined faults conform to geological feasibility.

Consequently, in order to make subtle features in the reflectivity data more discernible and therefore improve the ease of manual and/or automated detection of those features, it is known to mathematically process the seismic reflectivity data (i.e. seismic reflection traces) in accordance with known techniques to extract specific data characteristics. These data characteristics are also known as "attributes" or "seismic attributes" and a data volume disclosing one or more of those attributes is known as an "attribute volume". Seismic attributes are understood to be any measurement derived from the seismic data and typically provide information relating to the amplitude, shape and/or position of the seismic waveform in order to reveal features, relationships and patterns within the seismic data that may not be detected otherwise. More recently, attributes are calculated using more than one input seismic trace, therefore providing quantitative information about lateral variations in the seismic data. The so-called multi-trace attributes (i.e. when comparing multiple traces) may include coherence, dip/azimuth, structural orientation, semblance or volumetric curvature. However, any one attribute that highlights faults typically does so in an incomplete way, only capturing certain characteristics of the fault expression within the seismic data, such that, often multiple attributes are required to properly characterise and represent a fault.

FIG. 5 shows an example of a typical attribute volume 32 where faults are highlighted using a structurally orientated $1^{st}$ derivative filter.

However, despite the improvements in visually extracting geological features from seismic data, currently available computer based fault tracking software tools are still relatively unreliable, because very often feature models and/or visual representations are generated that are either not geologically feasible or meaningful, and the, for example, generated fault objects may not be conformant with the acquired seismic survey data. Furthermore, other currently available fault extraction tools may only create a different but still labour intensive workflow determining a multitude of candidate fault patches that are then interpreted by an experienced interpreter.

Accordingly, it is an object of the present invention to provide a method and system adapted to provide an improved workflow for adaptive fault tracking. In particular, it is an object of the present invention to provide at least an improved semi-automated and interactive workflow that enables adaptive fault tracking in geological survey data, such as 3D seismic volume data.

SUMMARY OF THE INVENTION

Preferred embodiments of the invention seek to overcome one or more of the above disadvantages of the prior art.

According to a first aspect of the present invention, there is provided a method for adaptively determining one or more faults from geological survey data, comprising the steps of:
(a) generating at least one attribute volume comprising a plurality of attributes from said geological survey data;
(b) identifying at least one region of interest on a predetermined cross-section of said at least one attribute volume;
(c) adding at least one seed to said at least one region of interest;
(d) defining at least one representative area in accordance with said region of interest;
(e) starting an initial generation of at least one basic geological object by adapting said at least one seed and/or representative area;
(f) selectively determining growth confidence levels for any of said at least one basic geological object based on a realistic geological principles, and mapping said at least one basic geological object with colour-coded data of said growth confidence levels;
(g) monitoring a visual representation of said at least one basic geological object during said initial generation;
(h) selectively stopping said initial generation of said at least one basic geological object;
(i) generating at least one optimized geological object through manipulation of at least part of said at least one basic geological object, wherein said at least one basic geological object is generated by applying a mesh propagation algorithm adapted to generate a surface mesh from said at least one seed, and which includes at least on predetermined constraint, including at least one external force, obtained from empirical geological data, and at least one internal force adapted to maintain the surface shape of said surface mesh.

The new workflow of the present invention provides several advantages. In particular, generating an attribute volume comprising more than one attribute can further improve the detectability/identifyability of a geological object (e.g. a fault) due to an optimized view of stratigraphic features. In addition, manual and/or automated manipulation of the geological object while it is generated and/or adapted (i.e. real-time visual inspection and feedback of the "growing" feature) by the system, allows for much faster interpretation and optimization of the feature of interest. Furthermore, by defining at least one representative area in addition to a seed placed in the region of interest further improves the quality of input information provided to the system, making the method more robust to any changes of the characteristics of the feature of interest and therefore allowing a wider variety of geological features, such as faults, to be tracked. For example, the operator, such as an experienced interpreter, may select a fault and draw a seed along at least part of the features length so that it can be adapted (i.e. "grown") into a volumetric/surface representation of the fault within the attribute volume. The operator may further select additional areas of the fault of interest providing the system with further qualitative input when adapting the seed into a 3D surface representation of the fault. Also, the method allows inputting qualitative information to the system from representative areas of one or more different (i.e. separate) fault features, but which have the same or similar characteristics than the fault of interest. Also, by displaying a colour-blend of the growth confidence levels onto a fault surface will provide the user with an instant indication of confidence so that the user may only manipulate areas of low growth confidence levels. In addition, the colour-coded confidence levels can highlight areas where two distinct faults have merged.

Preferably, the geological survey data may be 3D seismic data. Furthermore, the attribute volume may be generated from seismic attributes determined from the 3D seismic data. Also, the region of interest may comprise at least one fault of interest.

The at least one representative area may be an area that is part of said at least one fault of interest and/or an area that is not part of said at least one fault of interest. This provides the advantage that qualitative information can be input to the system further improving the adaption/generation of the fault object by guiding the system along the fault of interest.

Advantageously, steps (c) to (f) may be repeated until a selection termination criterion is satisfied. This provides the advantage of further optimizing the input parameters (seed, representative areas) for adapting/generating the fault object.

Advantageously, the basic geological object may be generated by applying a mesh propagation algorithm adapted to generate a surface mesh from said at least one seed and which may include at least on predetermined constraint. Even more advantageously, said mesh propagation algorithm may be further adapted to detect at least one other basic geological object and propagate said surface mesh so as to prevent any geologically unrealistic intersection(s) with said at least one other basic geological object.

Preferably, the at least one predetermined constraint may include at least one external force obtained from empirical geological data. Even more preferably, the mesh propagation algorithm may further be adapted to propagate said surface mesh planarly (i.e. substantially along a direction of a natural plane described by the geological feature).

Typically the at least one predetermined constraint may include at least one internal force adapted to maintain the surface shape of said surface mesh.

Advantageously, the at least one internal force may be based on any one of a local curvature of said at least one fault of interest and empiric geological constraints. Preferably, the at least one internal force may be selectively adjustable.

The generation of said at least one optimized geological object in step (h) may be achieved through manual manipulation and/or through automatic manipulation in accordance with said at least one predetermined constraint. This provides the advantage that the automatic system efficiency can be combined with the experience of the geologist when optimizing the generated geological object (e.g. 3D fault object). In particular, the system may apply data optimization algorithms adapted to adjust the generated fault object in accordance with known boundary conditions, while an experienced user may manipulate the generated fault object, either supplementing or correcting the automatic adjustment of the system.

Steps (g) to (i) may be repeated after adding at least one additional seed and/or defining at least one additional representative area and/or manually manipulating the geological object. This provides the advantage that the adapted fault object may be improved or extended even after its optimization by selectively adding additional qualitative information to the system.

Preferably, the manual manipulation may include any one of point-by-point editing, surface stretching, segment joining and segment splitting. In addition, the seed and/or representative area may be defined by any one of a point, a line defined by a plurality of points, a polygon defined by a plurality of points, an image mask selected from said attribute volume and an area painted in said region of interest.

In an alternative embodiment of the present invention, the at least one attribute volume may be a plurality of attribute volumes, each generated from predetermined characteristic attributes of said geophysical data. This provides the advantage that individual sections of the surveyed subterranean strata can be visualized in different attribute volumes, each attribute volume based on predetermined attributes that are optimized (specifically suitable) for identifying the specific features of that individual section. In addition, the individual sections may be combined in a single attribute volume applying different attributes for different sections of the strata.

Preferably, at least one dataset of the at least one optimized geological object may be exportable for further processing. This provides the advantage that the data can be viewed on different systems at different locations, and/or incorporated in other computer models.

According to a second aspect of the present invention there is provided a computer system for adaptively determining one or more faults from geophysical data according to the first aspect of the present invention, comprising a computer readable memory for storing data, an output device, a computer processor and an input device, such as a man-machine interface adapted to enable an operator to operate the system.

According to a third aspect of the present invention, there is provided a computer-readable storage medium having embodied thereon a computer program that, when executed by a computer processor, is configured to perform the method of the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

Figure 16:
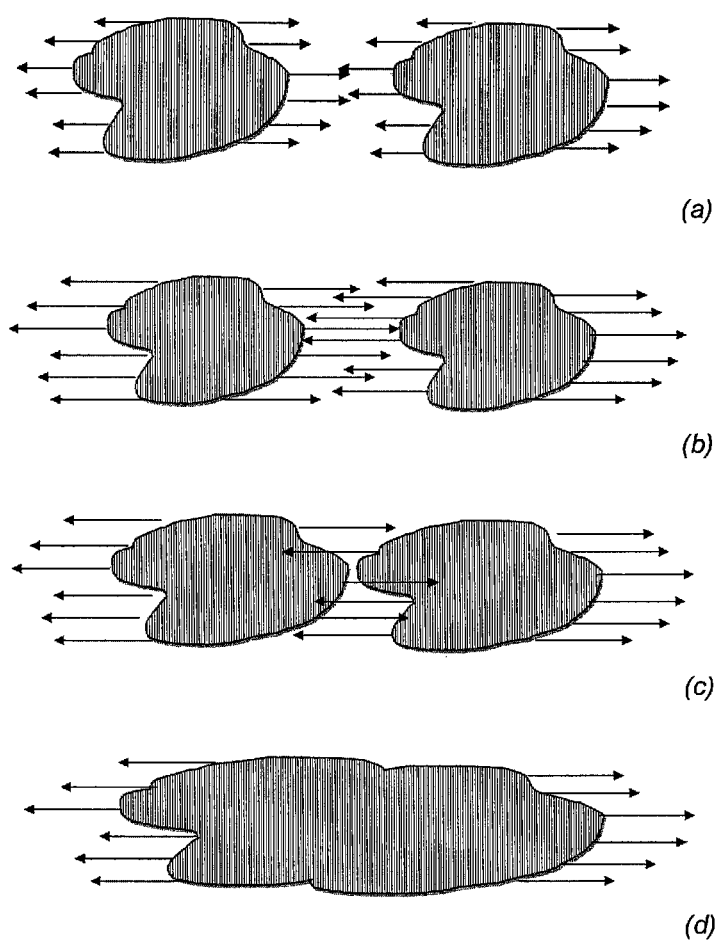
FIG. 16 shows a sequence (a) to (d) of an illustration example of two "growing" faults merging into one geological feasible fault surface.

For purposes of explanation, it should be appreciated that the terms 'determine', 'calculate' and 'compute', and variations thereof, as used herein are used interchangeably and include any type of methodology, process, mathematical operation or technique, including those performed by a system 400, as depicted in a simplified form in FIG. 16. The terms 'generating' and 'adapting' are also used interchangeably describing any type of computer modelling technique for visual representation of a subterranean environment from geological survey data, such as 3D seismic data.

Figure 6:
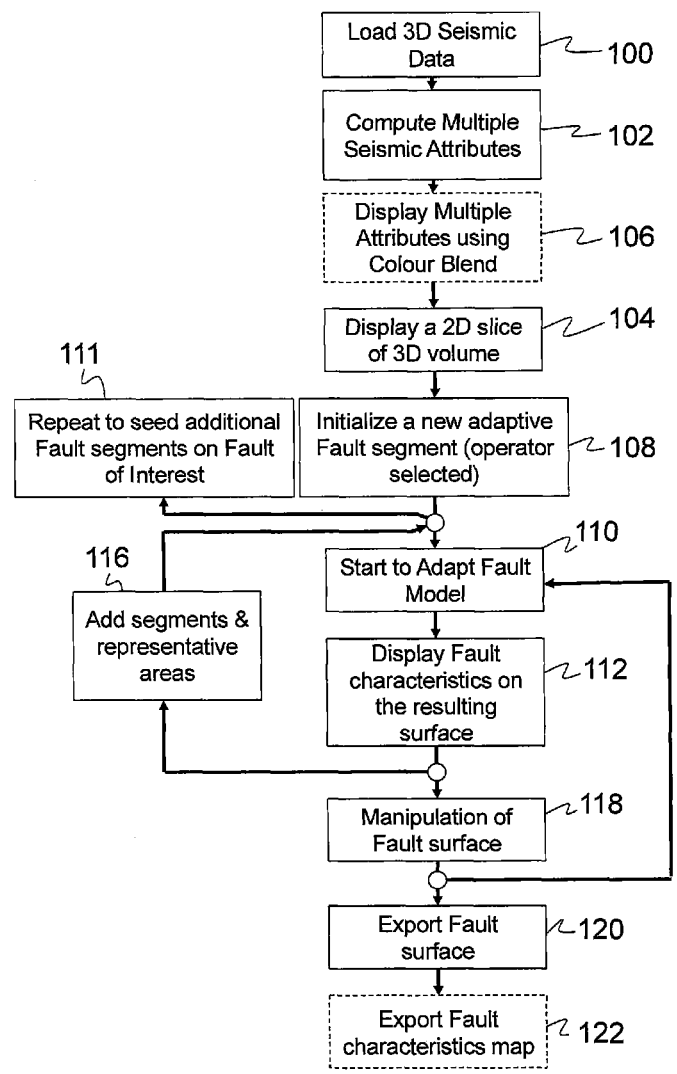
FIG. 6 shows a flow diagram illustrating an exemplary workflow and processes in general in performing the adaptive fault tracking in 3D seismic data according to an embodiment of this invention.
Figure 7:
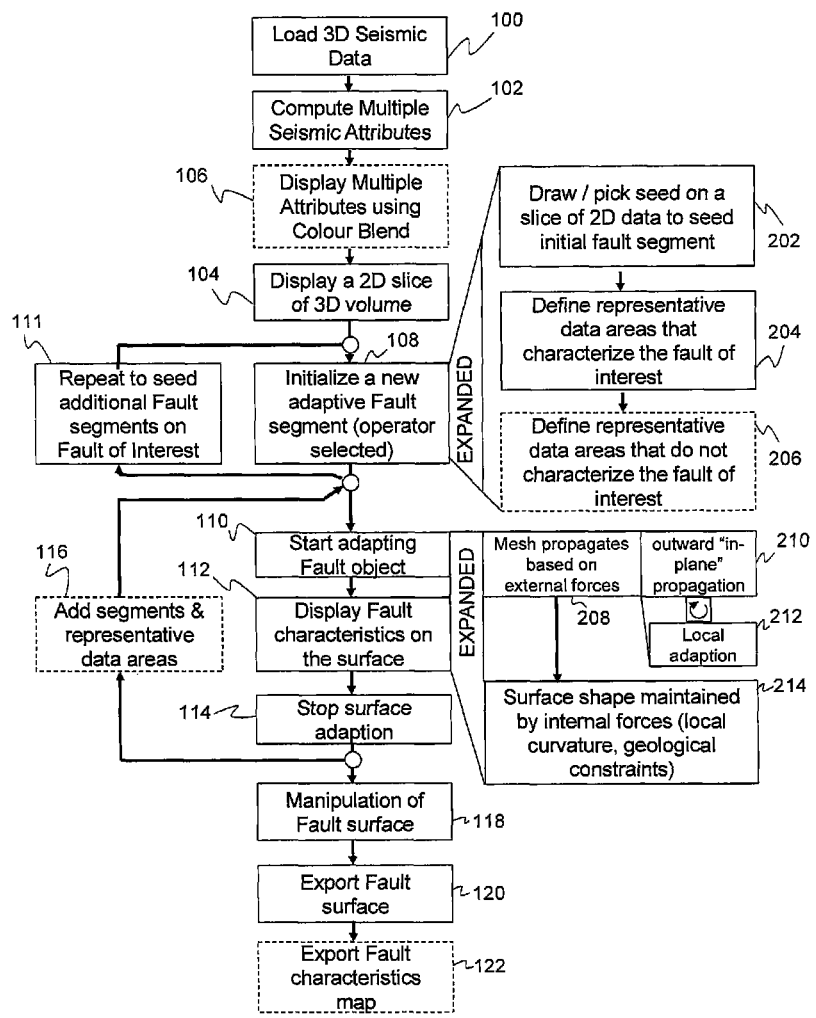
FIG. 7 shows a flow diagram illustrating the exemplary workflow and processes of FIG. 6 in more detail.

Referring now to FIGS. 6 and 7, a general, high level flow diagram and respective detailed flow diagram of the workflow method of the present invention is shown. The workflow approach is based on presenting the 3D seismic data to an operator, such as an experienced interpreter or a trained geophysicist, and a computer system processes the 3D seismic data and additional input from the operator in a manner that optimizes the visualization of the subterranean strata and the modelled geological features (e.g. faults) thereby enabling likely locations of hydrocarbon deposits to be identified.

Figure 1:
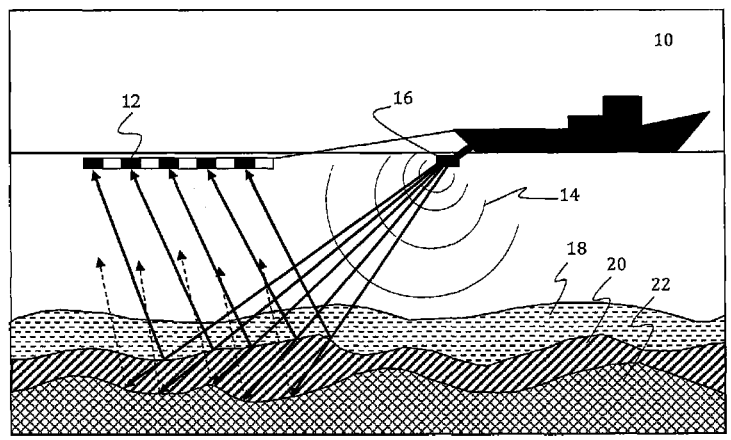
FIG. 1 shows a typical setup for an offshore seismic survey using an array of acoustic receivers (i.e. hydrophones) and sound waves generated by an air gun.
Figure 2:
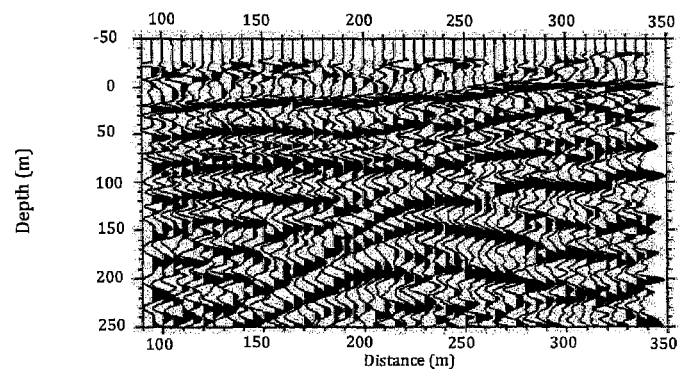
FIG. 2 shows a typical plot of migrated reflection traces recorded by the acoustic receivers after activating the air gun.
Figure 3:
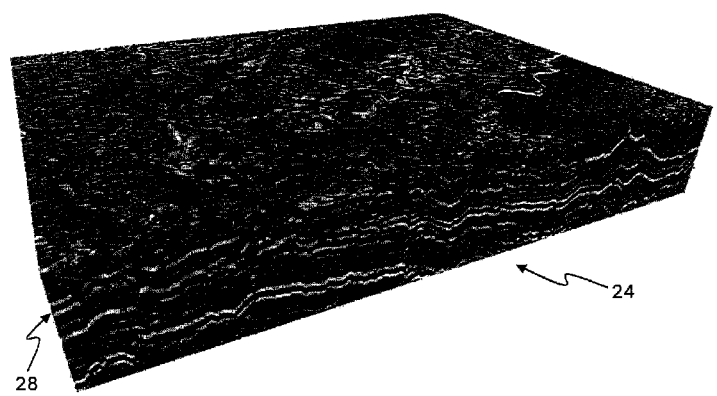
FIG. 3 shows a 3D volume of the migrated reflection data recorded by the acoustic receivers.
Figure 4:
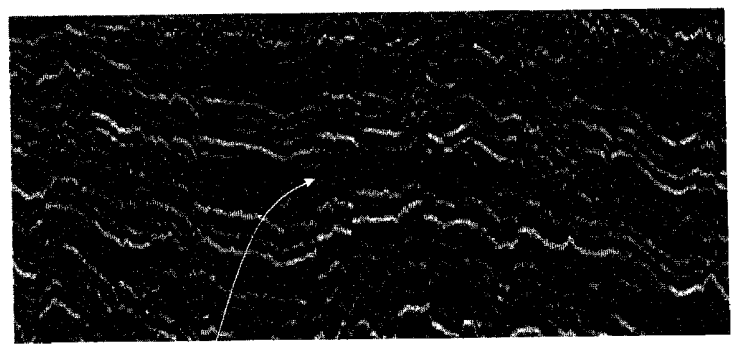
FIG. 4 shows a 2D slice of the 3D volume shown in FIG. 3 clearly showing discontinuities in the horizon layers caused by faults.

In this exemplary embodiment illustrated in FIGS. 6 and 7, 3D seismic data is loaded 100 into the system for processing. Random noise, coherent noise or any other artefacts may be removed or at least reduced from the 3D seismic data by applying a suitable noise filter and/or spatial filter.

Figure 5:
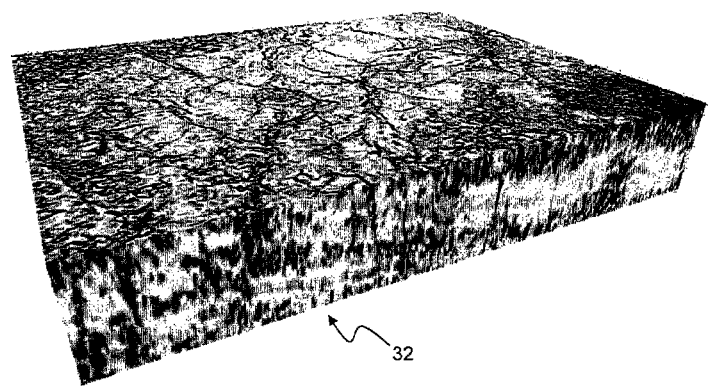
FIG. 5 shows a 3D attribute volume in which the faults are highlighted using a structurally oriented $1^{st}$ derivative filter, and wherein local orientation estimates are used to direct the measurement of the local partial derivatives of the reflectivity data of FIG. 3, while ignoring variations in the pole direction.
Figure 8:
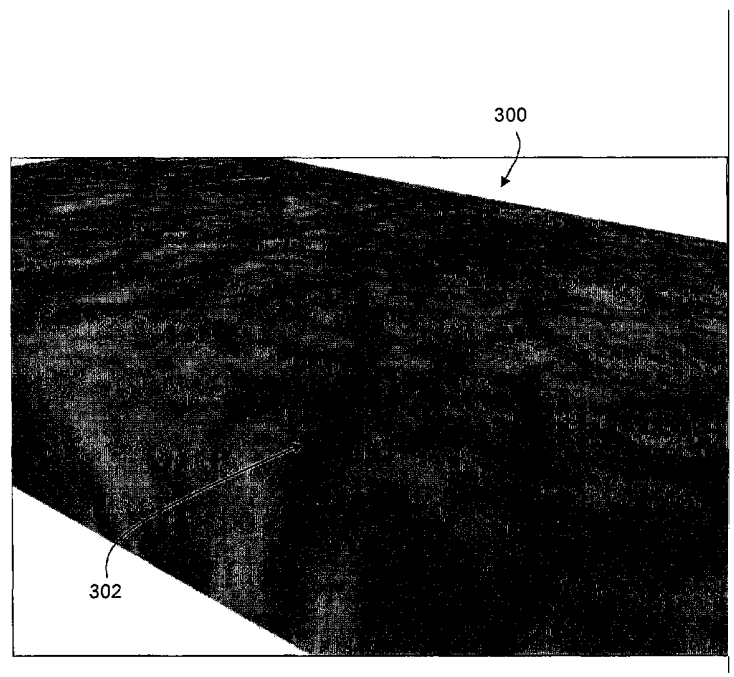
FIG. 8 shows a fault attribute volume optimized applying a gradient structure tensor algorithm.
Figure 9:
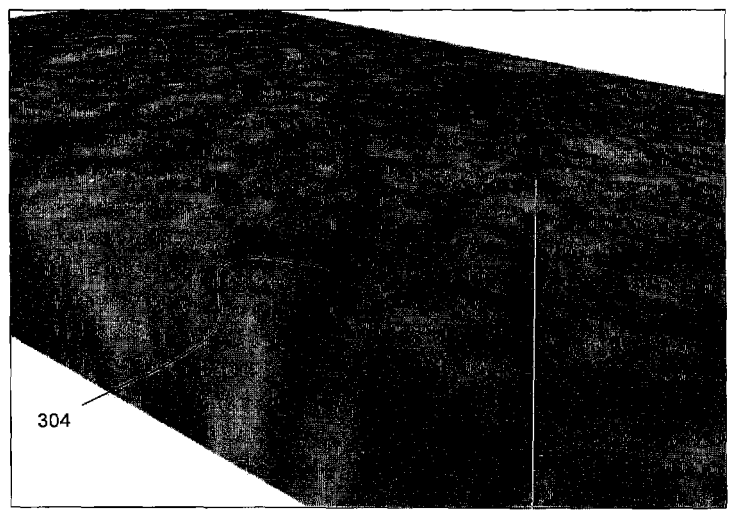
FIG. 9 shows a set of representative points (seed) picked along a fault response of the fault attribute volume of FIG. 8 and connected by a path line.

A plurality of attributes are then calculated and combined in order to synthesize an appropriate fault image for display on a screen and to further improve the detectability/identifyability of specific geological features and therefore making the extraction of the feature of interest possible. In this preferred embodiment, two or more attributes suitable for fault interpretation are calculated 102 from the 3D seismic data. The two or more attributes are then combined and displayed 104 within a fault attribute volume, such as shown in FIG. 5 and FIG. 8 (close up). The data including the attributes may be visualized 104 as a 2D slice from the 3D attribute volume. Suitable attributes of the 3D seismic data may be any one of coherency, similarity, variance, semblance, amplitude and structural attributes, such as curvature, azimuth and dip (as is known in the art), but any other attribute derivable from the geophysical data may be used to make the faults more visible.

Optionally, the plurality of attributes may be combined and displayed 106 using a colour blend for the juxtaposed attribute values, thus, providing an improved confidence level for the shape/profile and location/orientation of the fault objects.

Once the 3D attribute volume has been generated and displayed, the operator (interpreter, trained geophysicist) initializes 108 a new adaptive fault segment by "planting" 202 a seed in a fault region of interest (e.g. a fault feature) and starts 110 the adaption/generation process of the fault object (i.e. a computer representation of the tracked fault) from the seed. Typically the fault object adaption/generation process is by surface mesh propagation as described in more detail below. In particular, and as shown in the more detailed flow diagram of FIG. 7, a seed is "planted" by simply drawing or picking a seed in the fault region of interest. A seed may be a point, a line defined by a plurality of points, a polygon defined by a plurality of points, an area painted within the region of interest or an image mask selected within the attribute volume. FIG. 8 shows a close-up of a fault of interest 302 in an attribute volume 300, and FIG. 7 shows a seed 304 defined by a plurality of points and connected by a line that is planted within the fault region of interest 302.

One or more representative areas having the same or at least similar characteristics as the fault region of interest (i.e. the fault to be modelled), may also be defined 204 by the operator at this stage. In particular, it is possible to provide the system with additional input for generating and adapting a fault object from other fault regions that are not part of the fault region of interest, but which are easier to identify and select from the attribute volume. In particular, the information received from the easily accessible representative area(s) (e.g. a specific waveform characteristic or trackable attribute) may be used to evolve the fault object.

Optionally, one or more excluded representative areas may be defined 206 by the operator in order to provide further input to the system helping to "guide" the adaption of the fault object along a "true" fault 302 within the attribute volume 300.

Additional seeds can be planted 111 within the region of interest during this stage, wherein the initialization of the adaptive fault segment is repeated each time a new seed is planted until the operator is satisfied with the initial shape and orientation of the fault object.

Figure 10:
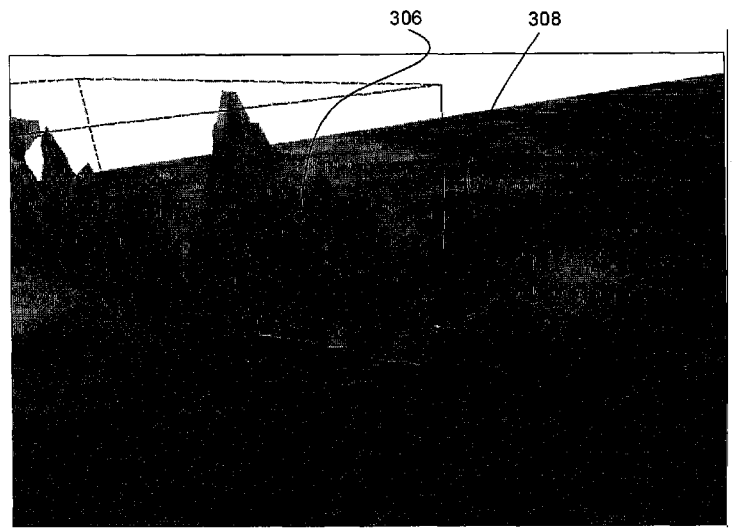
FIG. 10 shows a fault mesh object adapted from the initial seed shown in FIG. 9, and a vertex on the fault surface selected by the operator.
Figure 11:
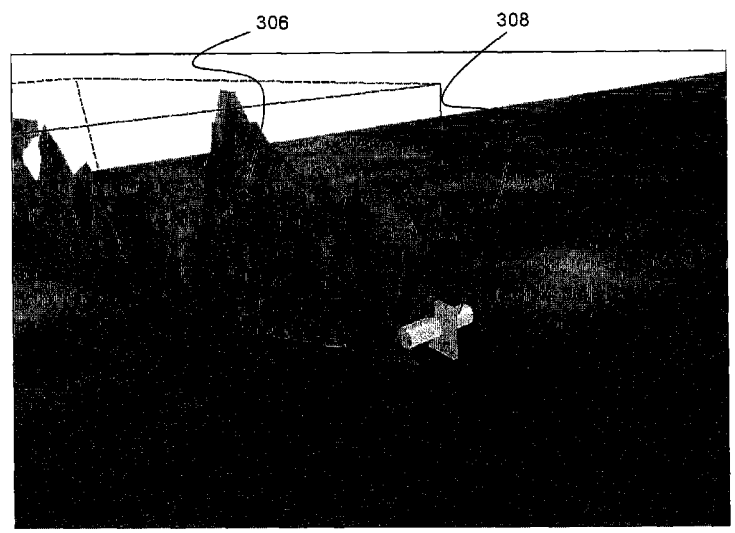
FIG. 11 shows the fault mesh object of FIG. 10 in a first mesh manipulation mode via the selected vertex.
Figure 12:
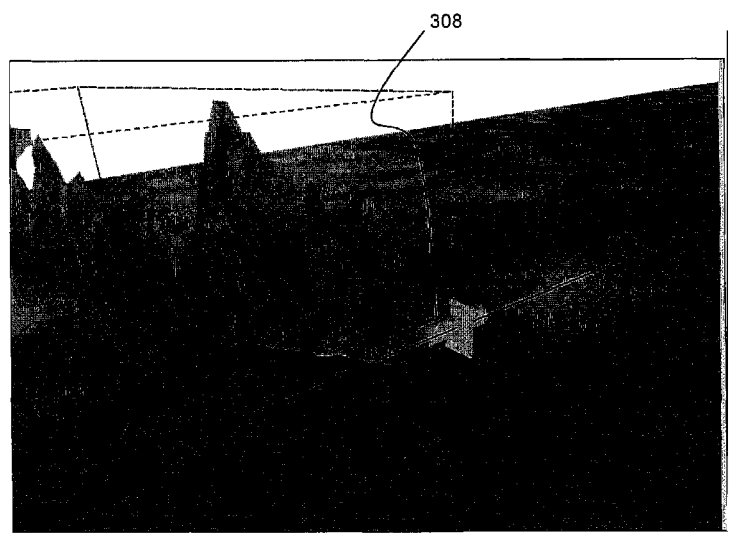
FIG. 12 shows an anticipated lateral movement (arrow) of the surface mesh of FIG. 10.
Figure 13:
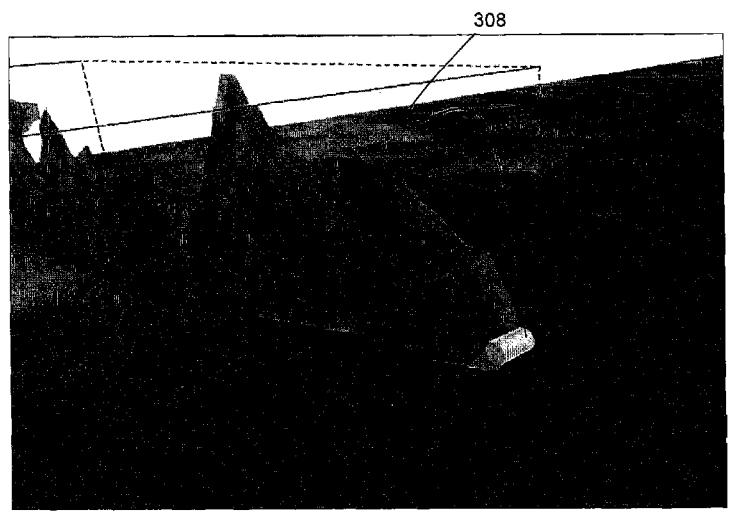
FIG. 13 shows an anticipated axial movement (plane and arrow) of the surface mesh of FIG. 10.
Figure 14:
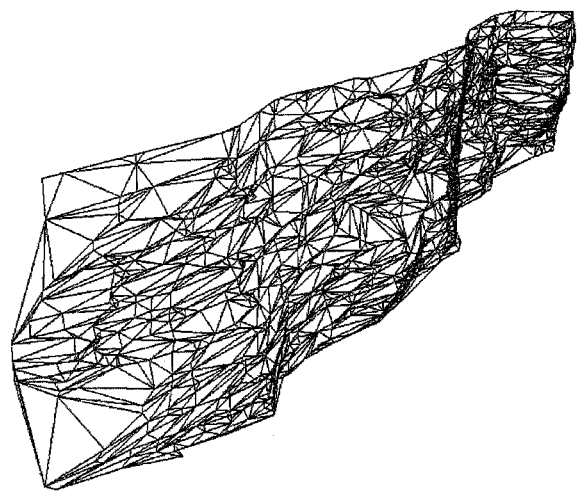
FIG. 14 shows an open surface mesh representation of a fault object "grown" from a seed such as shown in FIG. 10.
Figure 15:
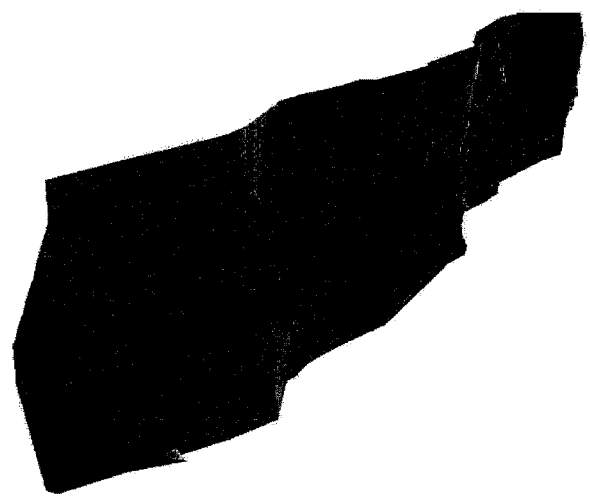
FIG. 15 shows a rendered surface of the open surface mesh of FIG. 14.

When generating and adapting 110 the fault object, a basic geological object such as, for example, an initial surface mesh computer model, is generated from the seed 304 and propagates in a data driven manner along the fault of interest 302 and as sampled by each seed 304 as shown in FIG. 10. Seeds and representative areas planted within the fault of interest define 208 external forces to the adapting surface mesh (fault object) that are suitable to limit or drive its deformation. Additionally, excluded representative areas are also used within the external force in order to limit its deformation into such regions. In particular, the open surface mesh propagation is based on internal forces 214 providing boundary conditions that limit the open surface mesh to geological meaningful shapes, i.e. as defined/constrained by surface topological measurements and/or fault model(s), therefore preventing the fault object to evolve/adapt into pathological cases. Preferably, the open surface mesh is limited to outward "in-plane" propagation 210, but this limitation is not understood as an exclusion of any other suitable mesh propagation techniques. During this process, the operator can selectively alter 212 the deformation parameters (e.g. external forces, internal forces) and the fault object 306 will adapt to the new parameters and interactively alter the deformation/adaption accordingly. In particular, the effect of the internal forces on the deformation process may be varied by changing an "importance" or "weighting" factor attached to the defined internal forces.

The method of the present invention allows the operator to monitor 112 the evolving fault object 306 and its surface characteristics in real time, and to selectively stop 114 the adaption process manually. Alternatively and/or additionally, the adaption process of the fault object 306 may be stopped automatically by the system in accordance with boundary conditions defined by the operator.

Optionally, further seeds and/or representative areas may be added 116 at this stage, wherein the fault object adaption is re-started 110 after each new additional input 116.

Once the surface adaption of the fault region of interest is completed, the operator may manipulate 118 at least part of the fault object surface, in order to optimize the object and comply with expert knowledge of an experienced interpreter. In particular, as shown in FIGS. 10 to 13, the operator can select, for example, a vertex 308 on a surface of the fault object 306 and manipulate the generated/adapted surface mesh in a free form manner, i.e. the operator can move the vertex 308 of the fault object 306 in any direction within the attribute volume 300. For example, when the operator moves the selected vertex 308 laterally, the system automatically deforms any corresponding parts of the surface mesh, accordingly. Axial movement of the selected vertex 308 allows the operator, for example, to "pull" the surface mesh across feature gaps that the system would interpret as insurmountable boundaries, so that the fault object 306 could then continue to adapt within the region of interest.

Other suitable manual manipulation 118 of the fault object performed by the operator may include any or all of point-by-point editing, surface stretching, surface segment joining, surface segment splitting, surface smoothing and/or surface erasing.

The final optimized fault object 306 representation can then be exported 120 (e.g. as a pointset) including any characterizing information derivable from the fault object 306 model and/or seismic attribute data for further use.

FIG. 16 illustrates an example of two merging fault objects, where the algorithm has determined the "merge" to be geological feasible, i.e. the two separate seeds grow into a single fault object.

Figure 17:
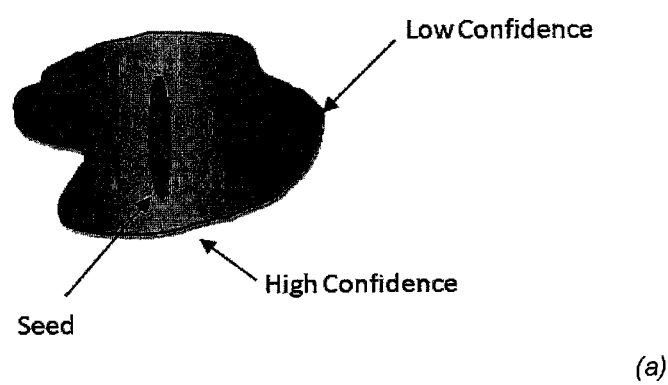
FIG. 17 shows example fault surfaces mapped with colour-coded confidence level data allowing the user to instantly identify potential manipulation points and erroneously merged geological objects.
Figure 17:
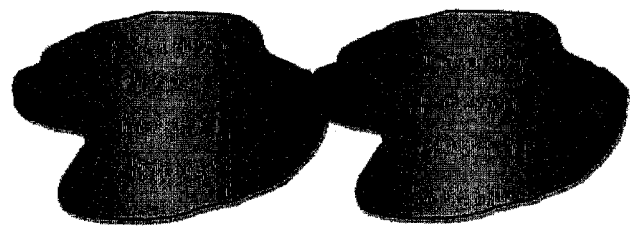

FIG. 17 (a) illustrates a generated fault object with growth confidence levels "mapped" onto the surface (illustrated in greyscale, but the confidence levels are generally colour-coded using RGB). The user will be able to instantly identify regions of low growth confidence indicating the most likely points for manipulation. FIG. 17 (b) illustrates two fault objects that have been "grown" towards each other to the point where a "merging" of the two objects is imminent. Growth confidence levels are mapped onto the surfaces, allowing the user to assess the geological feasibility of a single fault object in that region. In the particular example shown in FIG. 17 (b), the "merging" boundaries of the two objects have a low growth confidence, indicating that the two objects may not be a geological feasible single fault object. The user can manipulate any one of the objects into a growth direction giving a higher growth confidence level to the fault objects.

Figure 18:
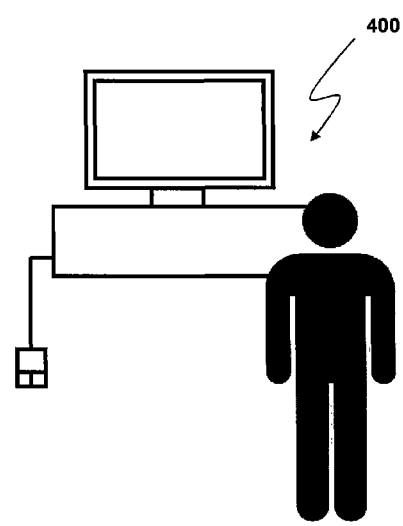
FIG. 18 shows a simplified example of a system and set-up in accordance with the present invention.

FIG. 18 shows a simplified illustration of a typical workstation 400 including a computer and monitor operable by a user.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A method for producing a visual representation of a subterranean environment, the method comprising the steps of:
   transmitting, via a seismic source, an acoustic signal that propagates into an area of substrate to be evaluated;
   receiving, via at least one seismic receiver, reflections of the acoustic signal corresponding to geological survey data, the geological survey data being proximate the area of substrate to be evaluated;
   (a) generating, via a computer processor, at least one attribute volume comprising a plurality of attributes from said geological survey data;
   (b), receiving from an operator an identification of at least one region of interest on a predetermined cross-section of said at least one attribute volume;
   (c) receiving from the operator an addition of at least one seed to said at least one region of interest, the at least one seed being at least one of a point, a line, a polygon, and an area defined within the at least one region of interest;
   (d) receiving from the operator a definition of at least one representative area having at least similar characteristics as said region of interest;
   (e) starting, via the computer processor, an initial generation of at least one basic geological object by adapting said at least one seed and/or representative area, wherein said at least one basic geological object is generated by applying a mesh propagation algorithm adapted to generate a surface mesh from said at least one seed, and which includes at least on predetermined constraint, including at least one external force, obtained from empirical geological data, and at least one internal force adapted to maintain a surface shape of said surface mesh;
   (f) determining, via the computer processor, growth confidence levels for any of said at least one basic geological object based on a realistic geological principles; constructing a map of said at least one basic geological object with colour-coded data of said growth confidence levels to provide the operator with an instant indication of confidence;
   (g) monitoring a visual representation of said at least one basic geological object during said initial generation;
   (h) selectively stopping said initial generation of said at least one basic geological object, responsive to at least one boundary condition constraint associated with the at least one basic geological object;
   (i) generating, via the computer processor, at least one optimized geological object through manipulation of at least part of said at least one basic geological object; and
   (j) constructing a visual representation of the subterranean environment, the visual representation including an optimized fault object representation based at least in part on the at least one geological object;
   utilizing the visual representation in the detection and identification of stratigraphic features during hydrocarbon exploration; and
   (k) responsive to the identified stratigraphic features from the optimized fault representation, providing an indication to a user with points for manipulation according to geological feasibility.

2. The method according to claim 1, wherein said geological survey data is 3D seismic data.

3. The method according to claim 2, wherein said attribute volume is generated from seismic attributes determined from said 3D seismic data.

4. The method according to claim 1, wherein said region of interest comprises at least one fault of interest.

5. The method according to claim 4, wherein said at least one representative area is an area that is part of said at least one fault of interest and/or an area that is not part of said at least one fault of interest.

6. The method according to claim 1, wherein steps (c) to (f) are repeated until a selection termination criterion is satisfied.

7. The method according to claim 1, wherein said mesh propagation algorithm is further adapted to propagate said surface mesh planarly.

8. The method according to claim 1, wherein said mesh propagation algorithm is further adapted to detect at least one other basic geological object and propagate said surface mesh so as to prevent any geological unrealistic intersection(s) with said at least one other basic geological object.

9. The method according to claim 1, wherein said at least one internal force is based on any one of a local curvature of said at least one fault of interest and empiric geological constraints.

10. The method according to claim 1, wherein said at least one internal force is selectively adjustable.

11. The method according to claim 1, wherein said generation of said at least one optimized geological object in step (i) is achieved through manual manipulation and/or through automatic manipulation in accordance with said at least one predetermined constraint.

12. The method according to claim 1, wherein steps (g) to (i) are repeated after adding at least one additional seed and/or defining at least one additional representative area and/or manually manipulating the geological object.

13. The method according to claim 11, wherein said manual manipulation includes any one of point-by-point editing, surface stretching, segment joining and segment splitting.

14. The method according to claim 1, wherein said seed and/or representative area is defined by any one of a point, a line defined by a plurality of points, a polygon defined by a plurality of points, an image mask selected from said attribute volume and an area painted in said region of interest.

15. The method according to claim 1, wherein said at least one attribute volume is a plurality of attribute volumes, each determined from predetermined characteristic attributes of said geological data.

16. The method according to claim 1, wherein at least one dataset of said at least one optimized geological object is exportable for further processing.

17. A computer system for adaptively determining one or more faults from geological data according to claim 1, comprising a computer readable memory; and wherein the input device is a man-machine interface adapted to enable an operator to operate the system.

18. A computer-readable non-transitory storage medium having embodied thereon a computer program, when executed by a computer processor, that is configured to perform the method of claim 1.

* * * * *